US009225618B2

(12) United States Patent
Riguidel et al.

(10) Patent No.: US 9,225,618 B2
(45) Date of Patent: Dec. 29, 2015

(54) METHOD OF TRACING AND OF RESURGENCE OF PSEUDONYMIZED STREAMS ON COMMUNICATION NETWORKS, AND METHOD OF SENDING INFORMATIVE STREAMS ABLE TO SECURE THE DATA TRAFFIC AND ITS ADDRESSEES

(75) Inventors: Michel Riguidel, Paris (FR); Philippe Laurier, Saint Pierre des Corps (FR); Laurent Ladouari, Paris (FR)

(73) Assignee: INSTITUT TELECOM-TELECOM PARIS TECH, Paris (FR)

( * ) Notice: Subject to any disclaimer, the term of this patent is extended or adjusted under 35 U.S.C. 154(b) by 842 days.

(21) Appl. No.: 12/995,620

(22) PCT Filed: Jun. 3, 2009

(86) PCT No.: PCT/EP2009/056786
§ 371 (c)(1),
(2), (4) Date: Jun. 14, 2011

(87) PCT Pub. No.: WO2009/147163
PCT Pub. Date: Dec. 10, 2009

(65) Prior Publication Data
US 2011/0307691 A1    Dec. 15, 2011

(30) Foreign Application Priority Data

Jun. 3, 2008 (FR) ...................................... 08 53675

(51) Int. Cl.
*H04L 9/00* (2006.01)
*H04L 12/26* (2006.01)
*G06F 21/62* (2013.01)

(52) U.S. Cl.
CPC ............ *H04L 43/00* (2013.01); *G06F 21/6254* (2013.01); *H04L 12/2602* (2013.01); *H04L 43/026* (2013.01)

(58) Field of Classification Search
USPC ........................................................ 713/150
See application file for complete search history.

(56) References Cited

U.S. PATENT DOCUMENTS 6,334,121 B1 *  12/2001  Primeaux et al. ................ 706/62
6,834,382 B2 *  12/2004  Marso et al. ................... 717/143
(Continued)

FOREIGN PATENT DOCUMENTS

JP   2004-80743 A      3/2004
WO   WO 0230046 A2 *   4/2002

OTHER PUBLICATIONS

Xiaoxin Shao, et al.: "SANTT: Sharing Anonymized Network Traffic Traces among Researchers," Network Operations and Management Symposium, 2006. NOMS 2006. 10th IEEE/IFIP Vancouver, BC, Canada Apr. 3-7, 2006, Piscataway, NJ, USA,IEEE, Apr. 3, 2006, pp. 527-533, XP010935710.

(Continued)

*Primary Examiner* — Andrew Goldberg
(74) *Attorney, Agent, or Firm* — Baker & Hostetler LLP

(57) ABSTRACT

A network includes communication media transmitting streams to addressees, and a method includes: step of allocation of a cryptonymic identity to communication media by a first instance, the streams transmitted by a medium bearing a mark, as a function of its cryptonym, the cryptonymic identity of a medium being distinct from its real identity; step of reading and of analyzing the streams by a second instance, the analysis including a phase of identifying streams to their communication media by searching for similarity between the mark of the streams and the cryptonymic identity of the media, with the aid of a table listing the cryptonyms, and a phase of logging observable characteristics of the streams through the network. A behavior defined by a set of characteristics is declared typical or atypical by comparison with a given set of criteria, the table of cryptonymic identities having no link with the real identities. The invention is applied notably for combating illegal downloads, the sending of material that is unsolicited or likely to cover up identifiable malicious intentions.

24 Claims, 7 Drawing Sheets

(56) References Cited

U.S. PATENT DOCUMENTS

| | | | |
|---|---|---|---|
| 6,880,090 B1* | 4/2005 | Shawcross | 726/14 |
| 7,140,035 B1* | 11/2006 | Karch | 726/1 |
| 7,472,423 B2* | 12/2008 | DeCenzo et al. | 726/26 |
| 7,555,482 B2* | 6/2009 | Korkus | |
| 8,220,054 B1* | 7/2012 | Lu | 726/24 |
| 2002/0035698 A1* | 3/2002 | Malan et al. | 713/201 |
| 2002/0089989 A1* | 7/2002 | Christensen et al. | 370/395.42 |
| 2003/0188171 A1* | 10/2003 | DeCenzo et al. | 713/185 |
| 2004/0073662 A1* | 4/2004 | Falkenthros | 709/224 |
| 2004/0098625 A1* | 5/2004 | Lagadec et al. | 713/201 |
| 2004/0168053 A1* | 8/2004 | Kaszkin et al. | 713/153 |
| 2005/0022000 A1* | 1/2005 | Inomata et al. | 713/200 |
| 2005/0108377 A1* | 5/2005 | Lee et al. | 709/223 |
| 2005/0234920 A1* | 10/2005 | Rhodes | 707/10 |
| 2005/0246434 A1* | 11/2005 | Bantz et al. | 709/223 |
| 2006/0141987 A1* | 6/2006 | De Groot | 455/411 |
| 2006/0225136 A1* | 10/2006 | Rounthwaite et al. | 726/26 |
| 2006/0277184 A1* | 12/2006 | Faitelson et al. | 707/9 |
| 2007/0162304 A1* | 7/2007 | Rodgers | 705/2 |
| 2007/0180521 A1* | 8/2007 | Malkin et al. | 726/22 |
| 2007/0213992 A1* | 9/2007 | Anderson et al. | 705/1 |
| 2007/0271604 A1* | 11/2007 | Webster et al. | 726/10 |
| 2007/0283417 A1* | 12/2007 | Smolen et al. | 726/2 |
| 2008/0034425 A1* | 2/2008 | Overcash et al. | 726/22 |
| 2008/0072290 A1* | 3/2008 | Metzer et al. | 726/3 |
| 2009/0049512 A1* | 2/2009 | Manickam et al. | 726/1 |
| 2009/0100522 A1* | 4/2009 | Kim et al. | 726/25 |
| 2009/0228439 A1* | 9/2009 | Manolescu et al. | 707/3 |
| 2010/0095351 A1* | 4/2010 | Liu et al. | 726/3 |

OTHER PUBLICATIONS

Jianqing Zhang, et al.: "Outsourcing Security Analysis with Anonymized Logs," Securecomm and Workshops, 2006; IEEE, PI, Aug. 1, 2006, pp. 1-9, XP031087509.

Pang R. et al.: "The devil and packet trace anonymization," ACM—Computer Communication Review, vol. 36, No. 1, Jan. 2006, pp. 29-38, XP002521824.

Hajime Morito, et al., "Identity Control Method Considering Privacy", IPSJ SIG Technical Reports—2005-CSEC-30, Jul. 22, 2005, pp. 467-471, vol. 2005, No. 70, Information Processing Society of Japan.

* cited by examiner

METHOD OF TRACING AND OF RESURGENCE OF PSEUDONYMIZED STREAMS ON COMMUNICATION NETWORKS, AND METHOD OF SENDING INFORMATIVE STREAMS ABLE TO SECURE THE DATA TRAFFIC AND ITS ADDRESSEES

CROSS-REFERENCE TO RELATED APPLICATIONS

This application is a National Stage of International patent application PCT/EP2009/056786, filed on Jun. 3, 2009, which claims priority to foreign French patent application No. FR 08 53675, filed on Jun. 3, 2008, the disclosures of which are incorporated by reference in their entirety.

FIELD OF THE INVENTION

The present invention relates to a method for tracing and for resurgence of pseudonymized streams in communication networks, notably telecommunication and television broadcasting networks, capable of making it easier to detect streams that are unauthorized or sought for other reasons such as statistical processes or metrological analyses. It also relates to a method for transmitting an informative stream in such a network, capable of securing the traffic or the access to data, its recipients and the terminal equipment used by the latter. It also relates to a device for protecting the identity of an interlocutor capable of dispensing with making use of the disclosure of real identities.

BACKGROUND OF THE INVENTION

The invention is applied notably for combating illegal downloading of intellectual works (uploading or downloading—and any form of handover for a broadcast or a stream activation), as well as the sending of unsolicited messages or the blanket solicitation of subscribers in order to encourage people to call numbers that are in reality charged for notably. It is also applied for analyzing and protecting interdependencies in the critical information and communication infrastructures. It is also applied for instilling trust in relationships between communicators.

Hereinafter the word "stream" will mean notably transmissions of files, documents, transmissions of streams, mail, telephone calls, in analog or digital form, and a transmission via an activation of one's equipment by a third party, following their voluntary or involuntary handover. This stream can take place between all types of terminals or of communication media. The activation and the addressees or the content of the stream may or may not be voluntary, and chosen or random.

Hereinafter, the word "server" will mean at the same time a server, a computer, an information processing machine or any medium involved in an information-processing operation of distributing information. This covers any communication medium, any equipment capable of transmitting a stream over a telecommunication or television broadcasting network, such as cell phones, personal digital assistants or else sensor or actuator networks. More generally, it covers the equipment associated with the foregoing and capable of being involved in this action, for example external electronic memories.

The networks, which may be open or closed, used in telecommunication for the transmission and delivery of all types of stream experience the coexistence of legal or illegal, friendly or inappropriate usage. Their great number, in terms of diversity and of data rates reduces the possibility of easily detecting these deviant usages. Added to the technical difficulties are legal, regulatory, ethical, cultural or economic constraints.

Downloads notably on the Internet, or variants such as peer-to-peer, handovers for the purpose of a one-off stream as well as continuous "streaming", have essentially appeared with the emergence of high bit-rate service for the subscriber (ADSL or optical fiber). This problem is very topical in the world but particularly in France following the present success of high bit-rate service and in particular of the following constraints which are sometimes contradictory:
- the creators and producers wish to be remunerated for access to their works;
- the internet service providers (ISPs) do not want to police the network;
- most internet surfers wish to consume legally, provided that it is simple and cheap;
- finally, data protection bodies, like the CNIL in France, are reluctant to observe, outwith any legal framework, the private behaviors of the internet surfers and to gain access to the content and to the private data of the citizens on a network, the IP address, notably in France, being the subject of debate with respect to whether it belongs in the private domain.

Data protection can therefore incidentally promote pirating since it also protects the pirates.

There is therefore a need to combat illegal downloading (uploading, downloading and any variant) on a large scale while complying with the foregoing constraints. Essentially, it involves finding, tracing and identifying the major pirates who collect audiovisual content or computer files in order to place them in the commercial circuit, this activity complying with the laws in force. Encouraging the standard user to consume legally means notably being easier and cheaper than consuming illegally.

Several known anti-pirating solutions could be envisaged, but they do not satisfy the need and do not comply with all the required constraints. Filtering of content on the networks operates with difficulty on the scale of the Internet or of a 3G network. The "radars" placed in strategic locations on the network for controlling content are only partially authorized and with various restrictions, because they constitute the open way to spying on content on the convergence networks, such spying often being similar to illegal tapping. Any process that is too intrusive or not discriminating ethically is moreover likely to trigger as a response a rush toward stiff protection methods, such as data encryption, which, in turn, would make them more difficult to observe and would cause a reciprocal ratcheting-up of resources leading to the coexistence of spaces with excess opaqueness or excess porosity. Moreover, the technical generations of hackers are changing rapidly, typically every 3 years. Downloading tools are rapidly becoming obsolete particularly since, within each technical generation, the counterfeiters know how to change suddenly as soon as the pirating method becomes too dangerous for them. It is therefore not very effective to track the methods of the current attacks and to think of a security system that can be kept up to date, because this system would be unlocked a few months later, without the possibility of sufficient change. In contrast, the object of the invention is to propose an open solution furnished with sufficient open-endedness to destroy or limit the various illegal methods on the Internet while complying with the various applicable constraints.

The telecommunication networks are experiencing a fall in the costs of routine use but a concomitant sophistication of value-added services. This divergence creates an asymmetry in which, for example, sending messages or making telephone calls for nefarious ends, costs the attacker less and less but costs the victims more and more, notably through callback numbers with very high charges. The result of this is that it is technically and financially easy to send bulk streams to a large number of interlocutors, causing general nuisance and a sufficient proportion of private individuals likely to fall into the trap. Within the enormous streams traveling over the telecommunication networks, there is a need to sort and examine the messages that have a profile characteristic of this type of transmittal.

Similarly, the downward trend in the costs of sending a stream, combined with the ease of bulk transmittals, opens a dangerous window favorable for example to spam, to "worms" or to computer viruses. These deviances are made easier by the absence, for technical or social reasons, of the easy application, for example, of cryptographic protocols for the nonrepudiation of transmittal, or of reception, which would make it possible to ascertain the origin and the destination of the messages. These obstacles require new solutions for examining the streams, solutions that make it possible to reduce these risks while respecting the legal requirements and the rules relating to privacy, intimacy and the desire of many users to remain anonymous.

Amongst the other constraints, there is the fact that, on the universal network of digital convergence, the Internet but also, for example, the network of the GPRS or 3G telecoms operators, the servers are sometimes out of space-time reach. They can, for example, be out of easy reach of the justice of a country for reasons notably either that the server is situated abroad, or it is in the country or in a neighboring zone but constantly operates through identity evasion ("it zaps"): the lifetime of the server is ephemeral, the latter is born, carries out its misdeeds and disappears to reappear under another identity.

Finally, there is a problem associated with the scattering or cooperation ("napterization") of the servers. There is an increasing amount of peer-to-peer activity (Bittorrent, eDonkey, eMule), of overlay applications on the Internet, or of distributed computing, namely that the multimedia content can come from several servers simultaneously or otherwise.

SUMMARY OF THE INVENTION

A first particular feature of the invention holds to its finding that providing better security for the distribution of content will require being as much as possible both at the beginning and at the end of the chain of the perimeter of distribution, or at the very least at strategic points in the networks where it is possible to intervene or collect all of the information. Note that IP routing over the Internet allows great freedom of routing of data packets inside a network. The object of the invention therefore is to intervene or to distribute a secret at the beginning of the chain (or as high up the chain as possible) for each homologated interlocutor, and to find this intervention or this secret again subsequently, so as to know that these streams are listed and to be able to presume that they are more or less without distinction with respect to a search. In this way, if necessary after cascaded filtering operations (in series and/or in parallel), a considerable volume of streams presumed to have a higher probability of matching the object of the search will be eliminated. Then, all that will remain will be to give priority focus to the residual stream detected in the successive screens, using for example in this case protocols that are not associated with this intervention or this secret in order to examine it further. This possibility of selective sorting by cascaded filtering brings to the present method a flexibility of use and of reconfiguration in order to adapt to any change in the modes and preferences of use for illegal purposes. It confers thereon, moreover, qualities of a tool-holder machine that can simultaneously use an unlimited number of examination tools.

It is through its combined capability of variability and variety of marking that the device proposes to remedy the weaknesses evoked above.

One of the major advantages provided by the presence of this secret element relates to its capacity to be modified periodically at intervals to be defined, at random, correlated with a degree of risk of discovery, or advantageously left to the discretion of the homologating authority. It being best that these modifications cannot be foreseen or reconstituted in their time of occurrence or in the variation made to the graft as defined below. No limit to the brevity of existence of a secret is necessary other than determined by the technical constraints of the marking device followed by examination. In order to propose a solution for observing the streams complying with the various constraints in effect, the subject of the invention is notably a method for the pseudonymized detection of streams.

It uses, on the one hand, cryptonymic identities of senders sorts both of an arbitrary grafting and external listing sign. These cryptonyms will hereinafter be called "grafts" by analogy with the usual function of grafting in other technical fields, and notably in horticulture (the action of grafting plants for the purpose of identifying them by virtue of this mark for the attention of a subsequent gardener), and by more general allusion to the term graft, designating the fact of printing a mark or a personal style on an object. The electronic cryptonyms used in the method according to the invention define a set of technical possibilities of marking or encapsulation, either of an item of technical equipment, or of a file or a stream, or finally of all these elements (as an extreme example, a grafting can also be a particular protocol such as IPSec, MPLS, etc). The invention establishes a cryptonym or "masking cryptonym" in order to emphasize the masking function thereof, of the true identity of the stream and of its sender. It provides a system of marking or of encapsulation that can be separately applied to a sender, as well as to a file or a stream, but without subsequently having the need to know it by a real identity.

Another advantage of the invention lies in its capacity to create a pseudonymizing procedure and ensure that it is complied with. This procedure is based on the coordination and the complementarity between on the one hand the means for creating this pseudonymization, represented previously by the concept of "masking graft", and, on the other hand, the means of ensuring that this pseudonymization is complied with during an observation of a stream, articulated about a segmentation of entities supplemented by a particular compartmentalization between these instances.

The method comprises at least three steps:
  a step of allocation of a cryptonymic identity to communication media by a first homologating instance A, the streams transmitted by a medium bearing a graft, as a function of its cryptonym, the cryptonym of a medium being distinct from its real identity, the communication medium not being able to definitively dispense with the graft without an authorization signal from the first instance A;
  a step of reading, analyzing and sorting (filtering) the streams by a second instance B, said analysis comprising a phase of identifying streams to their communication media by searching for similarity between the "masking graft" of the streams and the cryptonymic identity of the media with the aid of a table listing the cryptonyms, and a phase of logging observable characteristics of the streams through the network;

a behavior, defined by a set of characteristics, being declared typical or atypical by comparison with a given set of criteria, the table of cryptonymic identities having no link with the real identities.

The analysis of the behavior is for example carried out as a priority on the streams having no masking graft relating to a communication medium provided with a cryptonym. The user can usefully be informed of this particular feature for the purpose of encouraging him to furnish himself with a cryptonym. The effectiveness of the method is based partly on the fact that a high percentage of voluntarily homologated people makes searches easier by restricting to the same degree the residual field to be observed as a priority.

A communication medium can for example provisionally or selectively dispense with a masking graft without an authorization signal from the first instance.

A communication medium can for example provisionally or selectively dispense with a masking graft via an authorization signal from the first instance.

Grafting covers a function, which is to mask the real identity of a sender, since it functionally prevents the instance B from looking for the latter in a given stream. B is authorized to look at or store a real identity after ascertaining absence of grafting.

The second instance B can read streams at any point in the network and can advantageously carry out this reading of streams for example at the input and/or output of the communication media of the network managers, so as not to directly involve the latter. Advantageously, the analysis of the streams is for example carried out on their communication protocols.

The method may comprise a third step of reception of the signaling of typical or atypical behaviors by a third instance C, said instance being capable of verifying the legality of the corresponding streams. The instance C is for example capable of verifying the content of the corresponding streams.

Advantageously, the instances A, B, C can be compartmentalized without mutual access to their respective data other than through requests, according to a predefined degree of authorization to transmit them or respond thereto, offline or in real time. The method finds its full effectiveness of respect for privacy in a strong compartmentalization between A, B and C.

Emphasis should notably be given to the dual advantage exhibited by this listing culminating in a masking graft, at the same time of anonymity in the event of observation, and of greater probability of not being observed in one's general behavior.

Different forms of utility can be envisaged in other examination configurations, as an example of a possibility for a homologated structure to choose and possess its personalized and exclusive graft and then to privately and confidentially receive a logging account of its noted streams. This applies, for example, to a possessor of large servers who fears that his equipment might be influenced by a pirate, for a devious use such as the transmission of a large quantity of pirated music files.

A third particular feature of the invention relates to its finding that the multimedia traffic, such as music or video downloads and continuous "streaming" streams are too voluminous to be able easily to allow oneself to examine them explicitly by an inlaid tattoo inside the content for example. The method according to the invention will therefore simply inspect the network traffic with respect for example to its nature, its volume, its frequency, its form, its syntax or else its complexity, and will do so without initially verifying the content of the users and without touching this content, irrespective of the applications and of the users. The invention therefore differs from the usual monitoring devices aimed at the management of the content (content labeling, imprint, electronic signature, fingerprinting, hash code) since it makes it possible to initially identify behaviors during telecommunications, without the need at certain stages to identify by name, by their real identity, either their protagonists or the content exchanged.

The object of the invention is therefore notably to mark the content, but not the specific content of the communication. Initially it does not affect the content of the information of the senders and the receivers either therefore to mark it or initially to access it for the purpose of knowing it. This grafting will be carried out on the content of the communication, that is to say on the rules, the protocols used by the communication machines, independently of the physical players. It is therefore not the responsibility of the end user or of the transmitter, but of a third-party entity (A). Therefore, this grafting is greatly out of the control of wills and of the players, in the sense that these marks do not interact with private life and in the behaviors of these players. It is also out of the control of the defensive reactions of the pirates by encryption of the content.

"Grafting" covers an operating mode consisting in an addition, a removal or a characteristic modification, on a communication protocol, while respecting the standard of this protocol. Accordingly, because of this alteration, the mark can be considered a graft made to the original protocol referring back, for a given moment, to a single homologated sender. It is therefore also a graft in the sense of signature, but a signature that does not however refer directly back to a real identity. This cryptonymic signature is advantageously chosen by the instance A. This grafting is only partially similar to an absolute secret since the degree to which it can be read, its ease or difficulty of detection, and more generally its capacities to be invisible, inaccessible or incomprehensible will be at the discretion of the instance A. Against possible offenders, the graft provides an additional element of uncertainty, since the latter cannot anticipate the degree of camouflage chosen at a particular moment and for a provisional period.

Hereinafter, "grafting" must be understood in the broad sense, therefore designating notably:

- a labeling, a label that is visible, erasable or indelible, a labeling of an IP packet or of a stream (for example a labeling may consist in completing a field of a protocol header);
- an undetectable tattoo, washable or indelible, of a session, of a connection, of a stream or of an IP packet (for example, the cryptographic writing of a distinctive sign);
- a steganographic marking of spatial type (for example marking in a protocol field, before or after the user's payload content), or of temporal type (for example, specific use of the duration or the rate of transmission of the information, but complying with the standards);
- the use of a protocol with specific parameters (for example, the use of IPSec in IP with a given security association);
- the packeting of a communication by a composition of protocols (for example, the use of the MPLS protocol in addition to the IP protocol);
- the use of an additional protocol or of additional traffic.

This mark and trace system has security properties. The confidentiality of the marks and the discretion of the system is an advantage. A novel finding on which the invention is based is to consider that a single marking strategy, at a given moment and in all the communication networks, would be greatly inoperative, an ineffectiveness reinforced with the change in the usages and workaround manners used by the pirates. Consequently, the method must be capable of simultaneously handling several types of grafting.

Several grafting strategies are in fact possible, strategies dependent on the security policy of the beneficiaries. Some people will want to apply a security policy that is very strict and very costly, others will perhaps want to apply only a dissuasive marking. For example, one server may graft in a standard manner with a VPN MPLS and another with an IPSec AH security association in transport mode, notably for the purpose of exhibiting very simple standard cases.

Various strategies can also be envisaged with respect to the degree of automation of the grafting coming under a homologated sender. It may be either obligatory and with no option to provisionally dispense therewith, or come under a controlled right with the exception, for example for a situation in which an owner might lend his homologated communication terminal to others.

The marking or encapsulation system proposed by the invention can be subdivided into two parts:

First of all, the marking device itself. This device can be either in the communication medium of the sender, either at its output, or at a subsequent point, on the network, or at a predetermined intermediary, such as the instance A;

the second part consists of an element called a secret element. This element comes under two large families.

The first family relates to the secret elements transmitted by A and materially then held by their homologated holder. It covers various types of possible holders:
  a technical transmission medium of the homologated declarant, such as his computer or his cell phone. The secret element may, for example, be stored like a "cookie" in a temporary directory. It may also be several transmission media of this same declarant;
  a removable or mobile medium, such as a USB key, a smart card. This medium may be held in the name of a homologated person or structure such as a company, as a legal entity, acting in the name of its various members using the common removable or mobile medium;
  an individual knowing the secret element or a personal identifier activating it for the purpose of making this marking;
  or any combination of the above solutions.

The secret element may be the subject both of a storage for the duration and a dynamic write, based on data taken each time from the outside, while culminating in a marking of the stream by the sending equipment itself.

The second family covers the secret elements kept under direct management either:
  by the entity A;
  by a network operator or a service provider, as examples of intermediaries;
  by a trusted third party chosen by the homologated declarant.

In this second approach, the secret element is activated in terms of marking when A or any delegated authority finds a network connection or a stream coming under a previously homologated identity. The identity concerned being able to be notably either that of a communication medium (technical code of identity), or that of an individual or a legal entity (such as a subscriber: individual or company).

These two families are not mutually exclusive and can culminate in mixed solutions.

The holder can therefore just as well be a fixed or a mobile entity, or a physical or logical object, or an individual or a legal entity. Depending on the chosen security policy, a range of options will therefore be available, having respectively different qualities and weaknesses. Each security policy with respect to the choice of the holder is a matter of a search for an optimum. The method is not aimed at a total absence of circumvention, but a reduction of this risk to the minimum, constantly keeping in mind the encouragement not to circumvent it, for statistical purposes. The device that results therefrom can be accused of having "weak security", in the sense that it aims to keep itself permanently sufficient to dissuade a significant number of contraveners. It is a "just enough" tactic which therefore includes economic and sociological aspects in the setting of this optimum level.

Advantageously, a method according to the invention for example makes an informative marking designed to produce a message, such as an alert or warning on the harmfulness of the content. This marking will adopt the term of sticker as an analogy with the usual function of stickers in other fields of public life. It is for example placed by the second instance B or the third C at the request or else by referral of a moral authority. This mark can be made legible by any chosen communicator. Advantageously, it can be read by the communication media receiving the stream. In a particular embodiment, it may give rise to the sending of an informative message, this time to the sending address in order to signal comments for example. The informative marking can be carried out by marking means at any remote point, such as a point of passage of the network.

A real identity of a stream sender may be associated separately on the one hand with an invariant pseudonym, on the other hand with a variant cryptonym, functionally hiding the true identity, these two attributes having possible gateways between them but neither one nor both in combination allowing an external third party to work back, through their knowledge or their holding, to this real identity. The identities are personal and inaccessible to third parties.

The pseudonym can be explicitly disclosed to third parties by its holder, the cryptonym may not.

Advantageously, in the matter of identity management, three partially compartmentalized entities are for example deployed: an aforementioned instance A, an instance Z and an anonymization authority:
  the instance A explicitly knowing the link between real identity and graft.
  the instance Z explicitly knowing the link between real identity and pseudonym.
  the anonymization authority explicitly knowing the link between pseudonym and graft.

Advantageously, an invariant pseudonym of a given identity and a variant cryptonym of this same identity are for example in constant bijection within the instance responsible for this bijection, without intercession of this real identity at any time.

A further object of the invention is a method for transmitting a pseudonymized stream over a communication medium through telecommunication or television broadcasting networks capable of securing the data traffic, the stream comprising a graft representing a cryptonym independent of the real identity of its transmission communication medium and of the content that it carries, said cryptonym being referenced in a first instance A, the listing indicating the link with the corresponding real identity and said cryptonym being able to be found by a second instance B not having access to the corresponding real identity.

Advantageously, the cryptonym has, for example, the form of a secret element, considering that the methods of combating illegal downloading or the broadcasting of dangerous messages must themselves be secured.

The graft is for example inserted in the format of the communication protocol used, such as in a protocol header for example while complying with the standard of the protocol, without interfering with the specific data of the user.

BRIEF DESCRIPTION OF THE DRAWINGS

Other features and advantages of the invention will appear with the aid of the following description made with respect to the appended drawings which represent.

DETAILED DESCRIPTION

Figure 1:
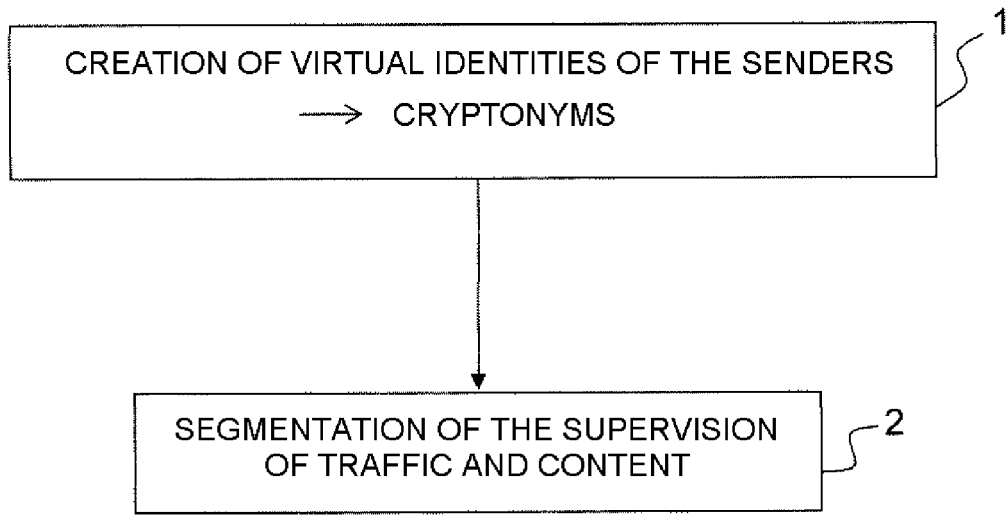
FIG. 1, a presentation of two large steps in the implementation of the method according to the invention.

FIG. 1 shows two large steps of a method according to the invention which will be explained in considerable detail hereinafter, on the one hand the creation 1 of cryptonyms of the senders, reflected by the use of masking grafts and, on the other hand, the segmentation 2 of the supervision of the traffic and content, based on the grafts.

Before going further in the description, note that multimedia traffic, such as music or video downloads and streaming notably, are too voluminous to be able easily to examine them explicitly, by an inlaid tattoo inside the content for example. Moreover, a body such as the CNIL [Commission Nationale Informatique et Libertés] in France, the national board which enforces data protection legislation, cannot authorize this type of direct reading for reasons of privacy protection. Moreover, an Internet service provider may not wish to provide a filtering service for illegal content so as not to get into a spiral of new responsibilities.

The method according to the invention will therefore simply inspect the network traffic, without initially verifying the content of the users and without touching this content.

The invention therefore uses on the one hand cryptonyms of the senders, sorts both of arbitrary grafting and of external listing sign. These cryptonyms can be separately placed both on a sender and on a document or a stream. These electronic grafts used in the method according to the invention define a set of technical marking or encapsulation possibilities, either of an item of technical equipment or of a document or a stream or finally of all these elements, Furthermore, the invention uses a segmentation of an entity for the control or supervision of traffic and of content. Three distinct instances can for example be used. These instances are compartmentalized so that they do not have mutual or reciprocal access to their respective databanks. Only certain predefined information can be transmitted directly or on request. The possible delegations of authority cited below are to be considered as capable of weakening the qualities of the method, and may be envisaged only as technical palliatives to which the same means and finalities of compartmentalization are subsequently to be applied.

Figure 2:
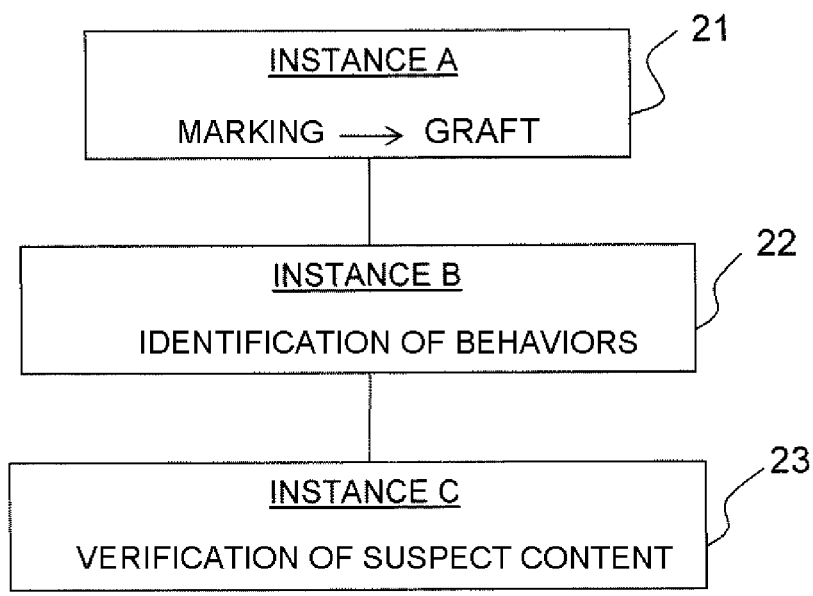
FIG. 2, a presentation of the streams' supervision entity segmented into three instances.

FIG. 2 shows these three instances 21, 22, 23. A first instance 21, hereinafter called instance A, intervenes in the marking or encapsulation of the communication servers or media. It lists those involved. It accepts, rejects or withdraws a listing, a listing being a source of marking by grafting. This graft may be carried out at the sender on its equipment, directly or by possible delegation of authority notably by way of the network operators, service providers or any other player responsible for organizing or routing the streams on these networks. The marking of a sender uses a technical device causing the masking graft of any document and any stream leaving this sender.

Such a marking system can be provided by the instance A, having in this case moreover the function of a trusted third party for example with players of the telecommunication system such as ISPs, users or distributers.

The grafting of a file or of a stream can be effective irrespective of the type of person involved who has activated the transmission, whether it be a communication medium manager or a third party. The activation of this transmission can be carried out from the sending equipment either remotely or at various network points, from other installations. This activation can be concomitant with the transmission or programmed.

The grafting of a file or of a stream is also possible during transfer by a medium dedicated to this task and controlled by the instance A, or any authorized third party, at any network point.

The masking graft of a stream can be read or registered by an approved controller such as the instance B defined below, or by possible delegation of authority to an operator for example, at any time and at any step in the transfer. The grafting of the documents can be made discrete, notably by a secret, so as to be able to be read or detected only by an authorized instance.

A second instance 22, called instance B hereinafter, makes an activity report. In particular, it identifies behaviors by relating streams to sender cryptonyms in the case of a masking graft. This is done for the purpose of finding behaviors that are likely to be culpable or sought for any other purpose. This instance as a priority searches for the presence or absence of a masking graft: if it is present, the instance satisfies itself with carrying out its analyses based on this cryptonym and searches for a real identity only if a graft is absent. Accordingly, the grafting is functionally similar to a carnival mask that does not remove a face but covers it in the eyes of an accredited observer, without the latter having the right to remove it. All he can then do is take note of a behavior during the carnival. The instance B does not have the authorization or the access to the true identities referenced by their grafts, these identities being known only to the instance A. The instance B only has, for example, a directory or table of the cryptonyms notably for reconciling the transmitted streams with their respective communication medium or senders. This directory can be updated in real time because of the necessity to base oneself on the swapping of the grafts by the instance A.

The instance B also does not have the possibility to verify whether a suspicion of malfeasance is exact or not, this role being devolved to the next instance 23.

Following this reading of the stream, a second type of marking, of an informative nature, can moreover have the function of notifying communicators, such as recipients or intermediaries of the stream, of a message notably a warning message on this stream. This message, called a sticker, can take any form such as being audible or visual for example. It may be explicitly formulated or reduced to a signaling element that may be standardized.

A third instance 23, hereinafter called instance C, receives the signals of behavioral reports that are sought, because they are for example atypical or presumed to be culpable, sent by the instance B. It can confirm or deny the assumptions emanating from these findings, notably by a verification of content of the transmissions. However, the instance C does not have access to the data reported by the instance B concerning a sender with respect to his detailed behavior. It does not know whether these data are considered representative of an illegal or legal behavior, typical or atypical, and of use or of no use with respect to the search criteria of B. C. The instance C ideally is informed only of the desire for verification, optionally combined with assumptions on the possible supposed or sought content.

Figure 3:
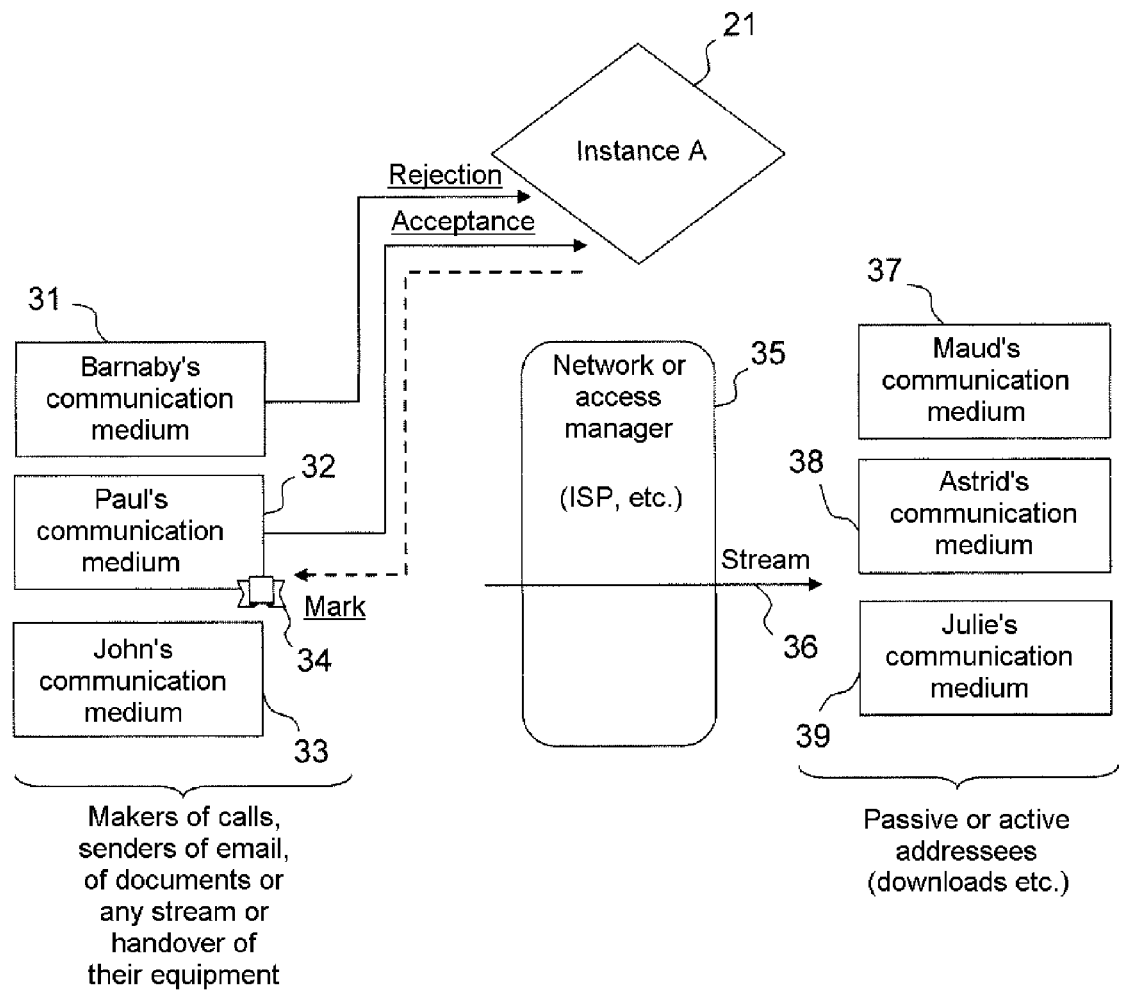
FIG. 3, an illustration of a phase of authorization for marking on communication media by a first instance.

FIG. 3 illustrates a first phase of implementation of the invention. More particularly, it illustrates the masking graft in association with the first supervision instance 21, the instance A.

To lift the lock of the vulnerabilities of the out-of-reach, pirate, anonymous, ephemeral or notably dispersed servers, the invention uses the grafting system. This recourse to grafting makes it possible to divide the traffic on the networks into two. On the one hand, there are the servers that distribute content with a grafting and on the other hand there are the other contents, with no grafting, which may a priori be considered more suspect. An analysis can therefore be carried out as a priority on these contents with no masking graft.

FIG. 3 illustrates the Internet players 31, 32, 33 symbolized by the proper names Barnaby, Paul and John. They send files, make telephone calls, send emails or any other streams as defined above. They can also hand over equipment for sending these streams. The three players of FIG. 3 illustrate three different cases. Barnaby 31 requests a listing from the instance A, that is to say the authorization to mark his streams with a graft. In the example of FIG. 3, the instance A refuses this authorization for Barnaby. Paul 32 requests a listing authorization which is granted to him by the instance A. Finally, John 33 does not request the use of grafts.

Paul's server 32 receives, for example, a secure element with a secret. This secure element may be installed and stored on the computer for example on a USB key, a smart card or stored as a "cookie" in a temporary directory or in any other way relating either to a physical or logical medium. The secret can be modified in time periods to be defined or left to the discretion of the homologating instance, for example every day, at random or on request. This secret is a means of identifying and authenticating the streams, the packets, the entities traveling over a network, in particular an application, a session, a connection, a stream, IP packets, MPLS packets, etc. Accordingly, the entities are marked by a graft 34 which contains this secret. For example, it is possible to decide to create a virtual private network (VPN) between the server, of Paul in the example of FIG. 3, and the ISP 35, via IPSec or via MPLS notably. MPLS acts at the input on the server and at the output on the ISP server. The private virtual network is, in this case, only a security association. It is still possible to add an IPSec hardware device in front of Paul's server and in front of the ISP, IPSec here being in transport mode and under the AH protocol with the mark of the input server.

The players 31, 32, 33 will send streams 36 to other players 37, 38, 39 who are passive or active receivers. They are for example active when they carry out a download. The streams are transmitted via a network managed by an ISP 35.

Amongst these streams, those coming from Paul will be marked with a masking graft, the others from Barnaby and John will not be and will no longer be sought a priori. It is not the function of instance A to detect the presence of grafts in the streams; it interacts only with those responsible for distributing content, such as Barnaby, Paul or John, in an automatic or nonautomatic manner. The requests for demands for grafts may for example be made automatically from the servers of the players 31, 32, 33 to a server constituting the instance A.

Generally the instance A is capable of homologating the identity of servers or of any communication media, by authorizing grafts on the one hand on these communication media and on the other hand on any stream sent by these entities. The instance A can therefore be the receiver of declarations of existence that are likely to come from all types of communication media capable of sending streams. A declaration may result both from a legal, regulatory or contractual obligation and from an optional choice. It may for example involve:
  a spontaneous approach of a user;
  an obligation or a request emanating from a third party to have rights of access to its equipment or data such as a commercial, school or association website or an electronic kiosk;
  a legal obligation, applying to users subjected to behavioral clauses or supervision decided upon by a court.

The instance A accepts or rejects the use of the graft. Accordingly, it is possible to initiate verifications of activities and enquiries of identity or of behavior prior to the fact of granting a cryptonym. Acceptance gives rise to a grafting of the technical transmission media of the authorized declarant, Paul in the example of FIG. 3. The grafts awarded and the identity of their beneficiaries are for example registered in an updated directory.

In parallel with the authorization of the grafting of the technical media, the instance A can homologate the technical codes indicating the identity of the senders, such as the address field of the IP source or packet for example. The homologated identities are for example brought together in an updated directory.

In one particular embodiment, it is possible to envisage an initial homologation of a sender making it possible subsequently to place, at any point of the network, by the instance A or any authorized third party, a masking graft of the streams bearing its technical identity codes.

The directories of cryptonyms are provided to the instance B, or by delegation for example to the network managers, service providers or any player responsible for the organization, regulation, routing or control of the streams on these networks.

In a first variant embodiment, these interlocutors do not have access to the comprehensive directory but transmit to the instance A, then the sole holder of the directory, the copies of the logged masking grafts, for the purposes of verification for example of their authenticity or of their validity. The instance transmits a response to each individual request.
  In a second variant, it is possible to use a black box placed at the disposal of the instance B or of a delegated third party, this being made available by the instance A. The black box remains under the control of this instance A for the management and modification of the data that it contains.
  In a third variant, the instance B or any delegated third party will have an updated copy in direct access and management.

Figure 4:
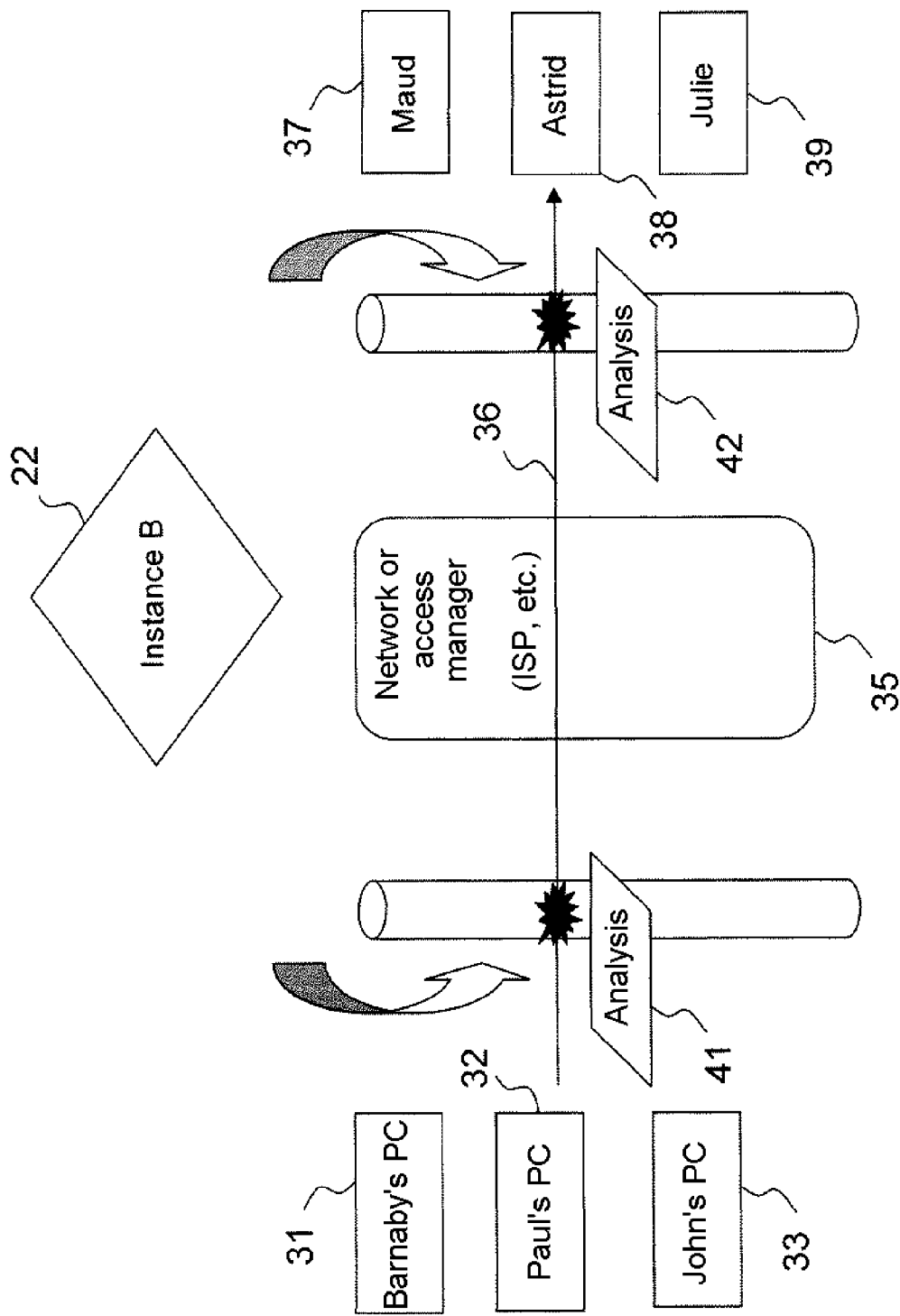
FIG. 4, an illustration of a phase for analyzing the streams by a second instance.

FIG. 4 illustrates the activity-analysis phase carried out by the instance B. As described above, the secret delivered by the instance A generates a mark by a graft called a masking graft. This graft is inserted into the format of the communication protocols, for example in the IP fields, and not on the actual content of the users. The instance B will therefore observe these protocols at strategic points preferably on the paths followed by the streams. In practice, observation systems such as probes are situated at these points. Advantageously, it is possible to take as a strategic observation point the input or output of the servers of the service providers ISP 35. FIG. 4 illustrates this verification for the players 31, 32, 33 of FIG. 3. In the example of FIG. 4, the positions of the reading points are upstream 41 and downstream 42 of the ISP and of any other network or service provider 35. The masking grafts can be read by the instance B, or any other player authorized by delegation such as the network managers or the service providers. The reading can be automated by the use notably of protocol analyzers. It can be carried out on the occasion of relays that already exist on the networks, either by for example a drop-and-insert operation established at any point on this network.

Figure 5:
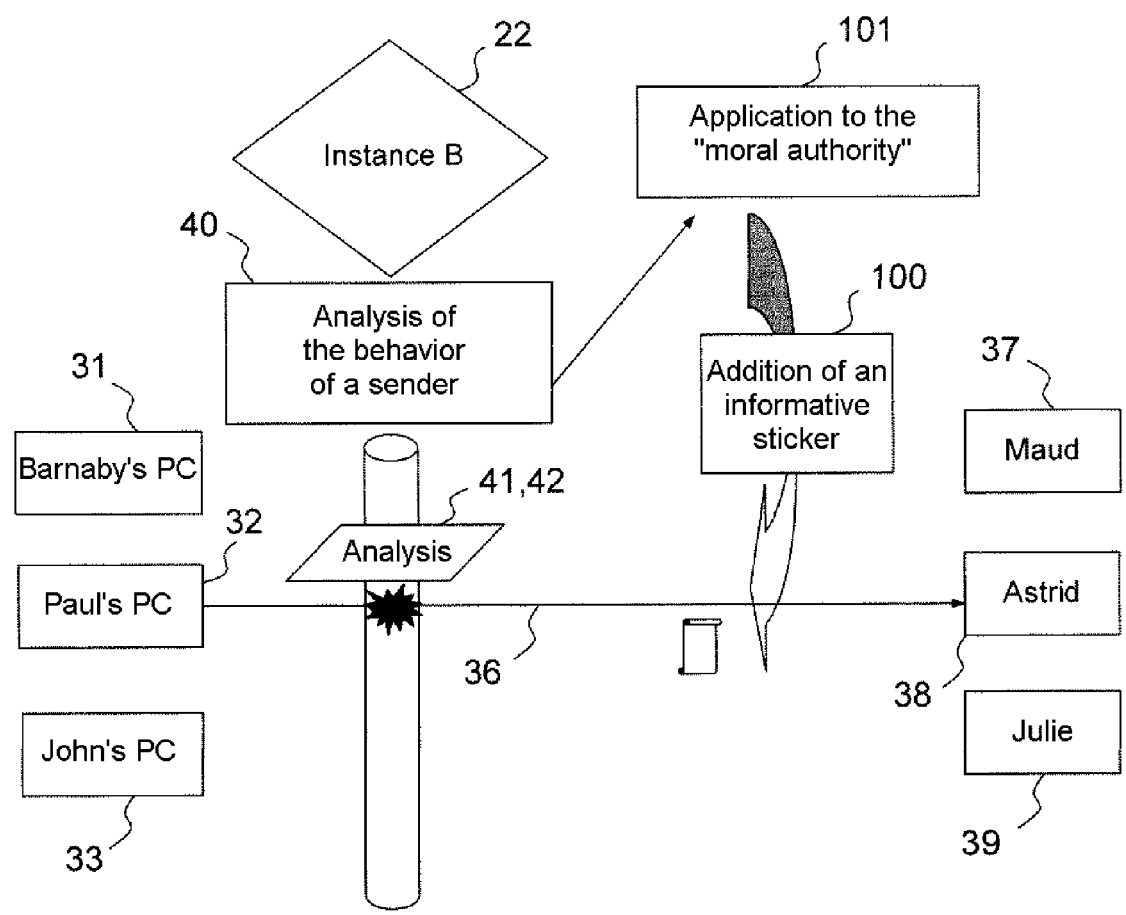
FIG. 5, an exemplary embodiment of a type of informative marking made by the method according to the invention.

FIG. 5 illustrates a second type of marking established by the invention, called informative marking, designed to produce a message, which may if necessary be reduced to a signaling element, being displayed to one of the communicators, automatically or at the request thereof, or as a corollary designed to remain invisible for certain third parties or intermediary receivers that are not desired in the information circle.

Certain streams 36, homologated or not, may be furnished, after their analysis 40, 41, 42, with informative stickers 100, designed notably to notify the addressees 37, 38, 39 of a possible danger for him, this notably when the content identified by C or the behavior of the sender found by B gives grounds to suppose a malevolence or conversely indicate to him that the sender or his stream has an a priori trust label. Advantageously, the decision to place this informative sticker can be delegated to a third party entity 101, in here called a "moral authority", so as not to confer upon the instances B and C a power of judgment or a capability of analyzing the appropriateness. The addressee of the informative sticker may also be the sender as indicated in the protocol fields, in order to communicate comments to him.

The invention generally develops a marking system the role of which places value on the variety of the possible functions of a mark, depending also on the moment and the location of its placement, and according to whether or not it is intended to be apparent to any social or technical player.

The instance B supervises and analyzes, at any possible point in the network, and advantageously at the reading points 41, 42, the traffic of the masking grafts. It similarly supervises and often as a priority the streams that are not marked by grafts. The instance B supervises and analyzes, preferably outside the frontiers of each of the entities, these entities ranging from the distribution servers, through the ISPs, to the end users.

The analysis phase allows the instance B to identify behaviors. Accordingly, the instance B may list relationships between senders and transmitted streams. Accordingly, the instance B has means for reading and processing the data. These means therefore, for comparison purposes, relate the grafting of the transmission to a parallel marking of the sender. In this manner, the instance B may identify behaviors reported to each communicator without knowing the corresponding identities. A behavior is the set of observable characteristics relating to one or more streams. In order to characterize a behavior as typical or atypical, it is then possible to compare these characteristics with a set of criteria or of reference criteria.

These behaviors can therefore entail the following characteristics, for example the number of transmissions, the volume of the transmissions or else their recurrence, their times, their rate, their automated appearance, and more generally any character likely to entail an underlying behavior or an intention. The method according to the invention is therefore, as indicated above, based on the search for similarities, or relationships, between a graft listed as being placed on the sender and the same graft placed on a traveling file or on a stream, always without knowing the real identity of the sender or the content of the stream. This identification of the behaviors can be carried out either at a given moment, simultaneous or subsequent, or over a period and on all the interchanges or on only a portion of the interchanges. Advantageously, the analysis can be of the quantitative or temporal type.

The tracing carried out by the instance B therefore consists notably in discovering, finding, following and analyzing the marks or their absence in order to reveal at an early date the anomalies and atypical behaviors and more generally any behavior sought. A learning period may be necessary to grasp the effervescence of the movement and the restlessness of all these marks or grafts. Conventional traffic-analysis tools used generally in the major networks can be used here. Statistical laws can be set up over time to ensure that if necessary the criteria for assessing the atypical behaviors evolve.

Figure 6:
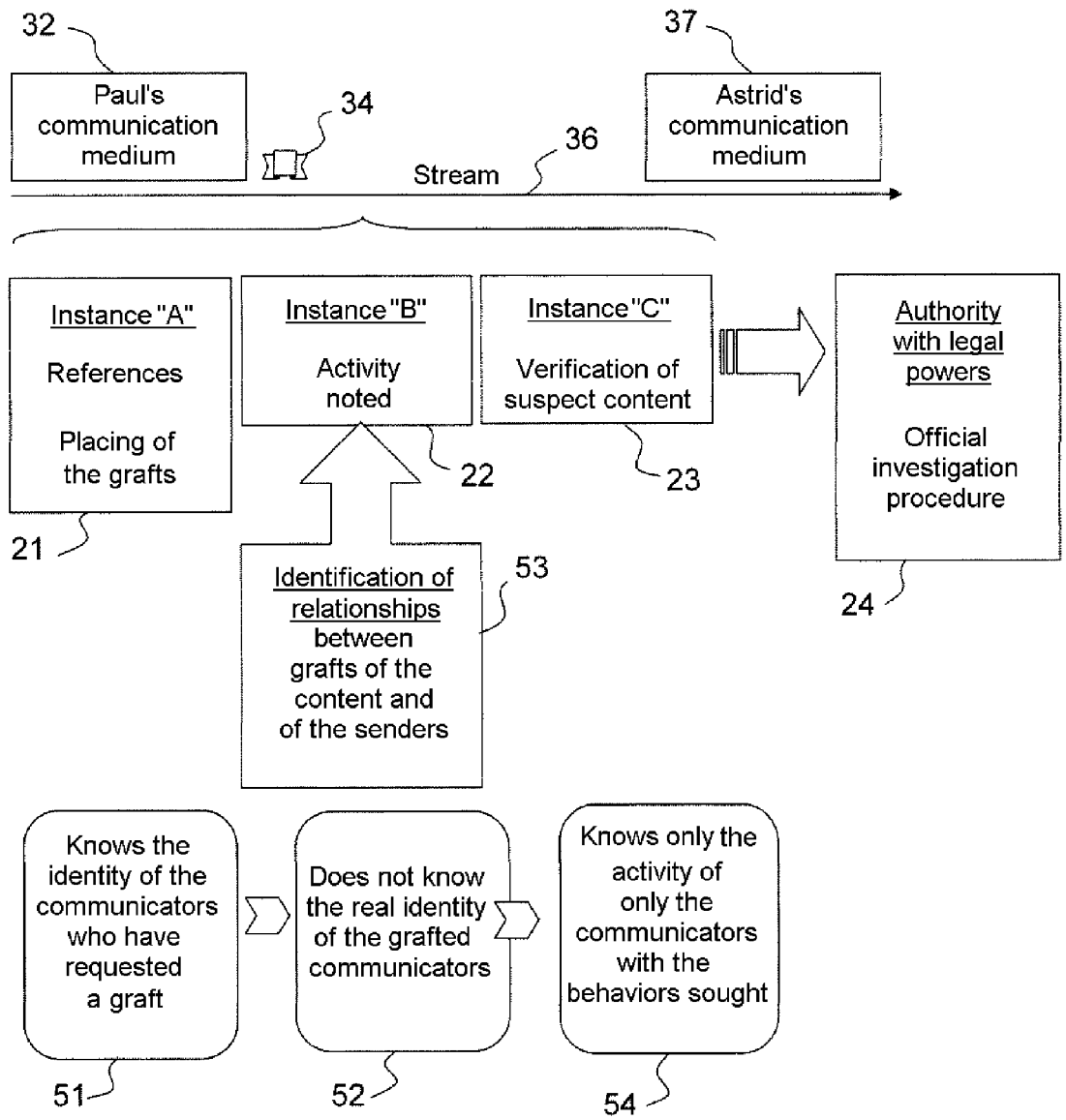
FIG. 6, an illustration of the various possible steps of a method according to the invention applied to a transmitted stream.

FIG. 6 illustrates all the possible steps for implementing the method according to the invention as described above. The figure illustrates the case of the transmission of a stream 36 by the communication medium 32 from Paul to the receiving communication medium 37 of Astrid. The first instance 21, the instance A, has authorized Paul's communication medium to mark the outgoing streams with a graft 34 indicating the cryptonymic identity of the transmission medium 32. The instance A is the only instance that knows 51 the real identity of the medium 32, through listing. This real identity may be the identity of Paul, the person responsible, an individual or legal entity, or else any identity making it possible to unambiguously identify the communication medium 32, in particular its location.

The second instance 22, the instance B, carries out an activity report without knowing 52 the real identity of Paul or the content transferred by the stream. The instance B has access only to Paul's cryptonym represented for example by a secret element contained in the masking graft, this secret element being able to be modified periodically. The instance B identifies relationships 53 between the grafts of the containers, that is to say the streams, and the senders, Paul's communication medium in the example of the figure. The instance B also analyzes the behaviors, as a priority on the streams with no grafts, but the analysis may also relate to streams with masking grafts, for example according to a sampling that is less dense than for the streams with no graft.

The following instance 23, the instance C, may, after the behavior analyses carried out by the instance B, begin procedures notably for verifying the content of suspect or sought streams. A suspect or sought stream is a stream, with or without a graft, the behavior of which is considered to be typical or atypical following the analysis of the instance B. In other words, the instance C knows 54 only the communicators with the behaviors found by B as being sought. It can, moreover, not know the reason for this behavior being considered typical or atypical, notably in case the initial suspicion or search turn out to be unfounded in the end. Depending on the desired degree of compartmentalization, it is possible for C not to know the overall behavior concerned, for example not to know the other streams emanating from the same source, or being sent to the same addressee, but not having been considered sought or suspect, as well as data likely to help to ascertain this overall behavior, such as the times, the numbers, the degree of regularity and of repetition of these streams, or even help to deduce a real identity therefrom, an individual or being attached to an identifiable community. In the event of a desire for extreme compartmentalization, the instance C may itself be fragmented internally so that the officials in charge of observing the content and those involved in the prior action of interception or of storage of the stream concerned do not communicate, so that the former do not know the identities (cryptonymic or real) of the senders and receivers of the stream.

At the end of the method, the instance C can communicate, automatically or otherwise, information concerning an a priori illegal stream to an authority invested with a judicial power and capable of beginning an official investigation procedure. The latter is able to retrieve the overall behaviors collected by the instance B, and the analysis for example of the content carried out by the instance C. This authority invested with a power such as a judicial power for example can therefore be sole final holder of information coming from the three instances:

the content, to be obtained from C;
the behaviors, to be obtained from B;
the real identities of the users bearing a masking graft, to be obtained from A.

Advantageously, the reverse order based on which this authority invested with judicial power can preferably be activated, makes it possible in this case to refer the case to it and make it possible for it to merge all the information only when the analysis process has advanced at least up to the instance B, and ideally as far as the instance C, the latter being designed to be, after reporting of the contents, the most legitimate to refer the case to the authority invested with judicial powers.

Facing one another, the invention therefore establishes several types of authorities that differ according to their functions and their attributions. These authorities will be responsible for receiving requests or notifications, more generally all information coming partly or wholly from the entities A, B or C, for the purpose of processing it and if necessary taking action thereon. They can also receive requests or proposals from external third parties, such as search organizations or judicial enquirers, with which they will act as an interface and buffer in order to reinforce the compartmentalization, which in this instance is external, of A, B and C. Notably identified are:

a first form of authority invested with a judicial power capable for example of having a right to know the examined contents and to initiate or participate in a judicial procedure;

a second form of authority, previously named the "moral authority", which may or may not have judicial powers, and is capable of judging as to the appropriateness of placing an informative mark on a stream, for the purpose of indicating to a communicator, such as its addressee, elements relating for example to a possible innocuousness or supposed danger;

a third form of authority, with no judicial power and no capacity for informative marking to the addressee. This authority being activated in the case of searches on the streams and the network users bearing no relation to their legality. It is invested with the right to receive the data originating for example essentially from the instance B. This is so as to form the interface with users of the collected statistical data for the purpose for example of sociological, statistical or else metrological research, this authority being able to judge as to the appropriateness of transmission of the data and remaining responsible for ensuring that these transmitted data remain anonymous. Access to the various items of information and the right to merge them will remain subject to the requirements of the law and to the rule of the compartmentalization decreed by the supervisor of the procedure in compliance with the invention;

a fourth, named the "anonymization authority", will be responsible for managing the pseudonyms for the purpose explained below.

Figure 8:
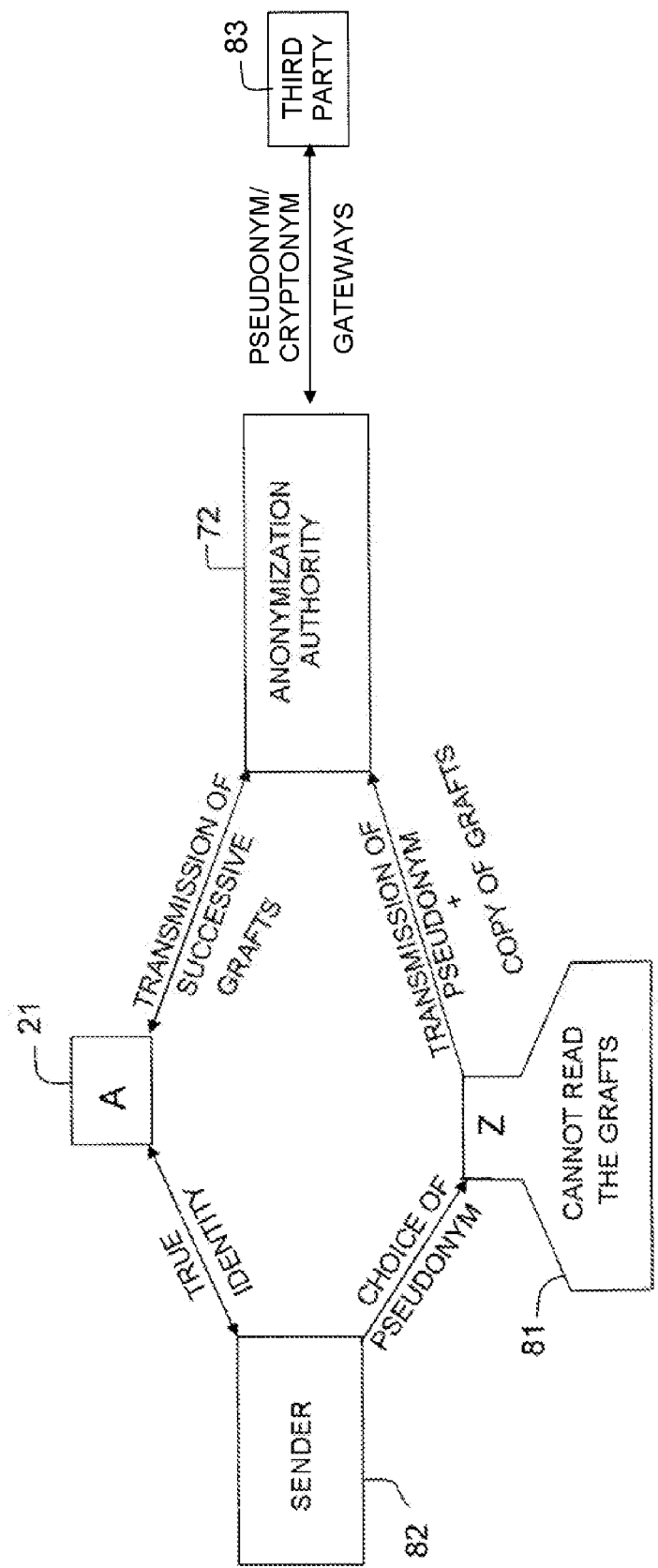
FIG. 8, a particular operating mode in which an identity, other than the real identity, relating to the sender of a stream, is capable of being subdivided into two.

In a particular operating mode illustrated notably by FIG. 8, the identity that is not the real identity, relating to the sender of a stream, is capable of being subdivided into two, the one and the other indirectly linked since being attached to one and the same real identity of the sender, but relating to different functions, modification modes and access modalities, the advantage of this method lying in the capability of one or the other identity to provide access to the other, under the restriction of prior authorizations, without having to reveal or know the real identity:

the first identity, already seen above, being present on the stream and corresponding to the masking grafting itself, remains protected as much as is desired, notably in the sense of being undetectable, indelible, inaccessible or unintelligible before any player or addressee other than the instances A, B and if necessary C, this part being able to be modified periodically and without logical sequencing at the discretion of A, and therefore not being stable or predictable or reconstitutable in its formal expression;

the second identity, hereinafter called the "pseudonym", which is not in the stream, will be stable over time and with respect to its holder, capable of not being able to hold another in parallel or afterward. This second identity will if necessary be able to be chosen by the sender.

The management of the pseudonym and of the cryptonym expressed by a graft relates back to compartmentalizations between three entities: the instance A 21, the anonymization authority 72, and an entity 81 hereinafter called Z, the instance Z being dedicated solely to the management of the link between a real identity and its pseudonym, without explicitly knowing the grafts.

A homologated sender 82 receives a proposal to choose a pseudonym, either from the instance A, or from Z. Z will receive this choice to the exclusion of the instance A, which will not be entitled to know it. The instance Z is functionally incapable of finding a graft in the emails or other streams that it receives from the sender. It transmits the chosen pseudonym to the anonymization authority 72, accompanied by the email or other stream coming from the sender and specifying this choice, this email bearing a graft awarded by A, but which Z cannot detect and read. Just like the instance B, the anonymization authority has the functional capability to detect the grafts which are its priority search, but their presence prevents him from subsequently finding the real identity of this sender 82. As a result anonymization authority is advised both of the pseudonym and of the graft of a sender, the real identity of which it is not designed to know. The instance A subsequently transmits, to the anonymization authority, the up-to-date versions of this graft, without referring to the real identity of its sender but referring either to a previous graft of this sender or to the original graft in this case called the parent graft, or to an arbitrary identifier coupled with this genealogy of grafts. The anonymization authority has on one occasion received a copy of this parent graft or of one of its subsequent variations through the instance Z. The anonymization authority carries out a cross-check between its two sources. The outcome of this device:

is that the instance A knows the real identity of a sender and his graft, but not his pseudonym;

is that the instance Z knows the real identity of a sender and his pseudonym, without being able to detect and read his graft;

is that the anonymization authority 72 knows the pseudonym and the genealogy of the grafts, without functionally having access to the true identity concerned.

The instance B is interested only in the first identity, corresponding to the masking graft. It carries out no search concerning the second, corresponding to the pseudonym, just as it carries out no search into the real identity of the stream and of its sender.

Figure 7:
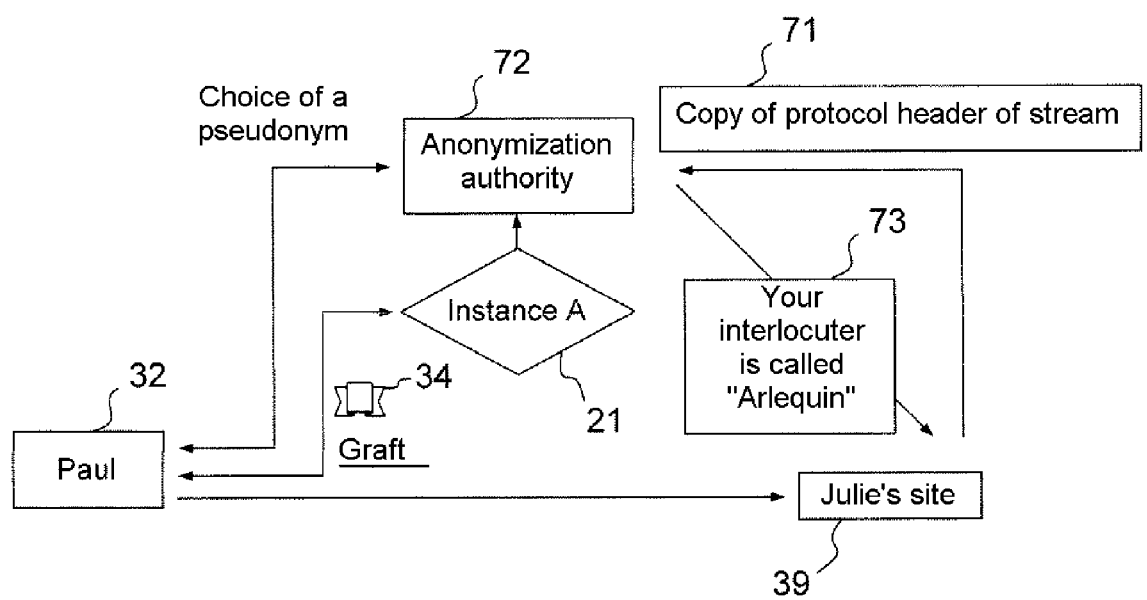
FIG. 7, an example of access to a pseudonym based on the possession or knowledge of a masking graft.

Various uses can be envisaged. A first use is access to the pseudonym based on the possession or knowledge of the masking graft as illustrated by the example of FIG. 7. In this example, Paul 32 is furnished with a graft and a pseudonym. He requests access to the site of Julie 39 who wants to know if he has homologation providing a graft and if he has already come to her site.

This pseudonym can be communicated or made accessible on a one-off basis, visible or legible to the eyes of certain interlocutors such as for example a website of Julie 39 who would make a proper request for it. The request may be accompanied for example by transmitting a copy of the protocol header 71 of the communication protocol or a more general copy of the graft-holder stream. Access to the pseudonym will be obtained from those with the authority to keep it and communicate it:

in a first variant, by or from an anonymization authority 72;

in a second variant, by a third party, worthy of trust, which it will have delegated for this purpose;

in a third variant, by or from the anonymization authority, with permission to view granted by the sender of the stream.

A second possible use is restricted on the part of the anonymization authority not to disclose a pseudonym but simply to confirm it, namely to confirm that such pseudonym known by a receiver indeed corresponds to the graft contained in a message claiming this pseudonym. In this variant, the fact that the sender has not had his pseudonym revealed to the receiver would prevent the latter from gaining knowledge of it by obtaining it from the anonymization authority. This therefore involves one of the situations in which the acceptance by the sender that his pseudonym be known by a third party 83 is prior, indispensable, and even nominative. Another path consisting in that the sender authorizes the anonymization authority to communicate it subsequently to such a designated third party or such a type of third party, as indicated above in said third variant.

These devices can be envisaged notably for the situations in which a commitment to honesty would be requested from this sender, just like a site allowing access to a service that it offers free of charge, for example in return for a subsequent other reciprocal service coming from the sender, in this case within the logic of an exchange, or else an ethical situation such as the commitment to keep a secret obtained at the time of the first visit. If this compensation is not fulfilled subsequently, the site would be able to recognize this sender at the time of a future visit and refuse him another access until the compensation has been obtained or made good.

The advantage of this method lies in providing a stable pseudonym attached to a changing mask (graft) itself relating to a stable real identity but remaining unknown. Like a carnival mask that can change regularly in the eyes of an observer posted at the entrance or inside, but, during the series of balls being able only to remain attached to one and the same constant pseudonym over time. Paul can regularly change mask but each new and different mask will be attached only to the sole stable pseudonym of Harlequin 73, originally chosen by Paul. "Paul" and "Harlequin" are permanent, whereas the mask changes. The pseudonym can be shown only to the person either whom the sender wishes, or the authority holding this pseudonym, or both jointly.

In this way, any observer who is present on the network and who has knowledge of or who holds (by receiving but without being able to recognize or read it) the graft of the sender or of his stream could not gain access to the stable pseudonym without the agreement of this sender and/or of the anonymization authority. And any authorized receiver of this stable pseudonym could not know in this way the true identity of the sender. The advantage of this method lies in that the receiver would however have the certainty that the stable pseudonym is attached either to an arbitrary masking graft, in the sense that it emanates from a sender who is not specified but who has been judged worthy of being homologated, or to a precise masking graft, in the sense that it effectively corresponds to the sender of such message. In this second situation, the receiver has the guarantee provided by the anonymization authority that it is indeed from the same sender as during a previous contact, even though the graft of this sender has been modified by the instance A in the meantime.

This interlocutor guarantee can lead either to an asymmetric mode, as in the previous situation in which only one of the two interlocutors requests a guarantee, and to a symmetric mode, this device having as its originality the fact of not being based on real identities, but on identities furnished with the triple complementary characteristic of being artificial, stable and unique.

Another use is the obtaining of a confirmation of possession by Paul of a homologation graft, based on the possession or the knowledge of the pseudonym. In this reverse method, the pseudonym can be used by addressing its holding anonymization authority or any delegated third party. On this request from the receiver of a stream asking for a given pseudonym, the authority can confirm that the sender does in fact possess a graft, without specifying the content thereof.

This confirmation of interlocutor homologation can lead both to an asymmetric mode and a symmetric mode.

These pseudonyms make it easier to form relationships between communicators on bases that are totally or partially anonymized, but unmodifiable, immutable and nontransferable other than through possible restrictive rules defined by the authority.

The invention claimed is:

1. A method for identifying streams requested in a communication network, the communication network comprising communication media transmitting the streams to addressees, the method comprising:

allocating, using one or more hardware processors, a cryptonymic identity to a communication medium by a first instance, the cryptonymic identity being different from the real identity of the communication medium;

applying, using one or more hardware processors, a graft mask corresponding to the allocated cryptonymic identity to one or more streams transmitted by the communication medium;

analyzing, using one or more hardware processors and by a second instance following the first instance, the one or more streams transmitted by the communication medium by:
  reading the one or more streams transmitted by the communication medium,
  correlating the graft mask applied to the one or more streams to cryptonymic identities in a table of cryptonymic identities and to the cryptonymic identity allocated to the communication medium, the cryptonymic identities in the table of cryptonymic identities being different from the real identities of the communication media, and the table of cryptonymic identities not including the real identities of the communication media,
  associating the one or more streams with the communication medium transmitting the streams based on a similarity determined in the correlation of the graft mask, and
  recording observable characteristics of the one or more associated streams through the communication network without access to the content of the one or more associated streams;
comparing, using one or more hardware processors, a behavior defined by a set of one or more of the recorded observable characteristics with a predetermined set of observable characteristics to determine whether the behavior is typical or atypical;
receiving, using one or more hardware processors and by a third instance, a signal indicating whether the behavior is typical or atypical;
verifying, based on the signal indicating whether the behavior is typical or atypical and by the third instance, the content of the one or more associated streams; and
verifying, based on the content of the one or more associated streams and by the third instance, lawfulness, according to the current laws of a jurisdiction, of transmitting intellectual work to the addressees via the one or more associated streams,
  wherein the recorded observable characteristics are linked only to the cryptonymic identity, and
  wherein the second instance has no access to the content of the one or more associated streams.

2. The method as claimed in claim 1, further comprising comparing, using one or more hardware processors, a second behavior defined by a set of one or more recorded observable characteristics of streams not including a graft mask relating to a communication medium allocated a cryptonymic identity with the predetermined set of observable characteristics to determine whether the second behavior is typical or atypical, wherein the comparison of the second behavior defined by the set of one or more recorded observable characteristics of streams not including a graft mask is performed by the one or more hardware processors with priority over the comparison of the behavior defined by the set of one or more recorded observable characteristics of streams including the graft mask.

3. The method as claimed in claim 1, wherein the signal indicating whether the behavior is typical or atypical does not transmit, to the third instance, information containing the result of the comparison of the behavior defined by the set of one or more of the recorded observable characteristics with the predetermined set of observable characteristics.

4. The method as claimed in claim 1, wherein processing by the first, second and third instances are compartmentalized with no mutual access to data from the other except from requests transmitted according to a predetermined degree of authorization.

5. The method as claimed in claim 1, wherein the second instance reads the one or more streams at a point within the communication network.

6. The method as claimed in claim 1, wherein the cryptonymic identity allocated to the communication medium is a secret element, the secret element determining the cryptonymic identity of the communication medium, and the one or more streams transmitted by the communication medium comprising a graft mask containing the secret element.

7. The method as claimed in claim 6, wherein the secret element is stored on the communication medium or is dynamically written based on data drawn from outside of the communication medium.

8. The method as claimed in claim 6, wherein the secret element is stored by an external third-party system, the third-party system being configured to allocate the secret element following transmission of the one or more streams, and the secret element relating to a previously homologated identity.

9. The method as claimed in claim 6, wherein the secret element is periodically modified by the first instance.

10. The method as claimed in claim 1, wherein the application of the graft mask to the one or more streams is automatically performed in or at an output of the transmitting communication medium for each transmittal.

11. The method as claimed in claim 1, wherein the application of the graft mask to the one or more streams is performed at a checkpoint of the communication network by a marker.

12. The method as claimed in claim 1, wherein an informative mark is placed by a marker in response to a signal originating from the second instance or from the third instance.

13. The method as claimed in claim 12, wherein an informative mark is placed by the marker in response to a signal originating from an independent authority configured to assess the appropriateness of the informative mark.

14. The method as claimed in claim 12, wherein the informative mark is placed by a marker in the one or more streams at a checkpoint of the communication network.

15. The method as claimed in claim 14, wherein information contained in the informative mark is configured to be read by receiving communication media or sending communication media of the one or more streams.

16. The method as claimed in claim 1, wherein the analysis of the one or more streams is based on communication protocols of the one or more streams.

17. The method as claimed in claim 16, wherein the graft mask is applied in the format of the communication protocol of the one or more streams while complying with the standard of the communication protocol, without interfering with the data within the one or more streams.

18. The method as claimed in claim 17, wherein the graft mask is applied in a protocol header according to the communication protocol of the one or more streams.

19. The method as claimed in claim 1, wherein a real identity of a sender of a stream is associated separately with a pseudonym and with a cryptonym, management of the real identity being compartmentalized in three entities:
  an instance A, an instance Z, and an anonymization authority, wherein:
    the instance A stores a link between the real identity and the graft mask;
    the instance Z stores a link between the real identity and the pseudonym; and
    the anonymization authority stores a link between the pseudonym and the graft mask.

20. The method as claimed in claim 1, further comprising comparing, using one or more hardware processors, a second behavior defined by a set of one or more recorded observable characteristics of streams including a graft mask relating to a communication medium allocated a cryptonymic identity with the predetermined set of observable characteristics to determine whether the second behavior is typical or atypical.

21. A method for transmitting a stream using a communication medium through a telecommunication or television broadcasting network configured to secure data traffic, said method comprising:
- referencing, using one or more hardware processors by a first instance, a graft mask representing a cryptonymic identity, the cryptonymic identity being different from the real identity of the communication medium used to transmit the stream and different from the content within the stream; and
- analyzing, using one or more hardware processors by a second instance, the one or more streams transmitted by the communication medium by:
  - reading the one or more streams transmitted by the communication medium,
  - correlating the graft mask applied to the one or more streams to cryptonymic identities in a table of cryptonymic identities and to the cryptonymic identity allocated to the communication medium, the cryptonymic identities in the table of cryptonymic identities being different from the real identities of the communication media, and the table of cryptonymic identities not including the real identities of the communication media,
  - associating the one or more streams with the communication medium transmitting the streams based on a similarity determined in the correlation of the graft mask, and
  - recording observable characteristics of the one or more associated streams through the communication network without access to the content of the one or more associated streams;
- comparing, using one or more hardware processors, a behavior defined by a set of one or more of the recorded observable characteristics with a predetermined set of observable characteristics to determine whether the behavior is typical or atypical;
- receiving, using one or more hardware processors and by a third instance, a signal indicating whether the behavior is typical or atypical;
- verifying, based on the signal indicating whether the behavior is typical or atypical and by the third instance, the content of the one or more associated streams; and
- verifying, based on the content of the one or more associated streams and by the third instance, lawfulness, according to the current laws of a jurisdiction, of transmitting intellectual work to the addressees via the one or more associated streams,
  - wherein the recorded observable characteristics are linked only to the cryptonymic identity, and
  - wherein the second instance has no access to the content of the one or more associated streams.

22. The method as claimed in claim 21, wherein the cryptonymic identity is a secret element.

23. The method as claimed in claim 21, further comprising inserting the graft mask in the format of the communication protocol of the communication medium while complying with the standard of the communication protocol, without interfering with the content within the stream.

24. The method as claimed in claim 23, wherein the graft mask is inserted in a protocol header.

* * * * *